US 6,553,220 B1

(12) United States Patent
Marks

(10) Patent No.: US 6,553,220 B1
(45) Date of Patent: Apr. 22, 2003

(54) DATA NETWORK COMMAND PACKET AND TELEPHONE NETWORK CALL INTEGRATION IN ENHANCED SERVICES SYSTEM

(75) Inventor: Bennett David Marks, Carlysle, MA (US)

(73) Assignee: Comverse, Inc., Wakefield, MA (US)

( * ) Notice: Subject to any disclaimer, the term of this patent is extended or adjusted under 35 U.S.C. 154(b) by 0 days.

(21) Appl. No.: 09/205,700

(22) Filed: Dec. 4, 1998

(51) Int. Cl.⁷ .............................................. H04M 11/10
(52) U.S. Cl. ....................... 455/413; 455/412
(58) Field of Search .................... 455/412, 413, 455/466, 404; 370/264, 904, 354

(56) References Cited

U.S. PATENT DOCUMENTS

| | | | | |
|---|---|---|---|---|
| 5,594,779 A | * | 1/1997 | Goodman | 455/3.04 |
| H1641 H | * | 4/1997 | Sharman | 455/466 |
| 5,694,453 A | | 12/1997 | Fuller et al. | 379/57 |
| 5,706,211 A | * | 1/1998 | Beletic et al. | 709/206 |
| 5,711,011 A | * | 1/1998 | Urs et al. | 455/520 |
| 5,758,280 A | * | 5/1998 | Kimura | 455/412 |
| 5,832,065 A | * | 11/1998 | Bannister et al. | 379/93.08 |
| 5,999,965 A | * | 12/1999 | Kelly | 709/202 |
| 6,006,087 A | * | 12/1999 | Amin | 455/413 |
| 6,157,827 A | * | 12/2000 | Fujiwara | 455/413 |
| 6,298,231 B1 | * | 10/2001 | Heinz | 455/412 |

* cited by examiner

*Primary Examiner*—Nay Maung
*Assistant Examiner*—L West
(74) *Attorney, Agent, or Firm*—Staas & Halsey LLP

(57) ABSTRACT

A wireless telephone handset sends commands over a data network, and places voice calls over a telephone network, to a message storage system. The commands include information that enables the message storage system to identify the handset and correlate the voice calls with their corresponding commands. The message storage system can then execute the commands by playing or recording voice signals over the voice channels provided by the voice calls.

18 Claims, 4 Drawing Sheets

DATA NETWORK COMMAND PACKET AND TELEPHONE NETWORK CALL INTEGRATION IN ENHANCED SERVICES SYSTEM

BACKGROUND OF THE INVENTION

1. Field of the Invention

The present invention is directed to a system for accessing stored messages over a wireless telephone network and, more particularly, to a system that utilizes a plurality of bearer channels to communicate commands and messages between a wireless telephone and the message storage system.

2. Description of the Related Art

Existing message storage and retrieval systems, sometimes also called "enhanced services systems", allow different types of messages, such as is voicemail, facsimile or e-mail messages, to be stored for later retrieval by subscribers of such systems. Examples of these systems are described in U.S. Pat. Nos. 5,029,199: 5,193,110; 5,260,990; 5,263,080; 5,475,748; 5,493,607; 5,524,139; 5,519,766 and 5,008,926, all incorporated herein by reference. Such systems allow a caller or sender to leave a message, such as a voicemail message, for a subscriber whenever the subscriber is not available. When a message is retrieved, the subscriber typically uses a telephone to call the system over a wireless or wire line telephone connection. The subscriber then presses keys on the telephone to generate touchtones to "log on" to the system, i.e. enter his or her mailbox number or passcode, and then to control the system, e.g. to command the system to play, save, delete, etc., the message. In these systems, the telephone connection between the subscriber's telephone and the system must be established before the subscriber can obtain a listing of messages or select one or more of the messages for playback. In addition, this telephone connection must be maintained throughout the subscriber's interactions with the system. This long-duration telephone connection poses problems, however, because a "voice port" on the message storage system is occupied for the duration of the telephone connection, and these voice ports are expensive. Furthermore, if the subscriber uses a mobile, e.g. cellular, PCS, etc., telephone to access the system, the call occupies a wireless voice channel for the duration of the telephone connection, and these channels are also expensive.

It is, therefore, an object of the present invention to reduce the amount of time a voice channel is required when a subscriber accesses his or her mailbox.

It is also an object to reduce the amount of time a voice port is required when a subscriber accesses his or her mailbox.

It is an additional object to provide an authorized subscriber access to his or her messages without requiring the subscriber to enter his or her mailbox number or passcode.

It Is a further object to provide a simple visual interface to a message storage system that simplifies the tasks associated with message access and administration.

SUMMARY OF THE INVENTION

A typical wireless telephone handset includes a display screen. Many modem wireless telephone handsets also include a limited-function browser (a "micro-browser"). The present invention utilizes this screen and micro-browser to display a list of messages, including voicemail messages, facsimile messages or e-mail messages, that are stored in a subscriber's mailbox by a message storage system. Using this screen and micro-browser and keys on the handset, the subscriber can select and manipulate one or more of the messages, such as causing the message to be displayed on the screen (if it is a text or graphic message), played over the telephone (if it is a voice message or a message that can be converted to speech), deleted, saved or forwarded. The list of messages can include information, such as a caller's name or telephone number, the time a message was deposited, the type of message, e.g. voice, facsimile or e-mail, and an indication of urgency of the message. This information can be displayed on the screen to facilitate the subscriber's message selection. Using buttons on the handset, the subscriber can scroll through the list of messages and select one or more of these messages to be acted upon.

A wireless connection between a wireless telephone handset and a base station carries one or more so-called "bearer" channels, including a voice bearer and a data bearer, e.g. CDPD or GSM-CSD, although in many wireless telephone systems only one bearer channel can be active at a time. Typically, at least one of the data bearer channels is established whenever the handset is powered on, even if the handset is not actively handling a voice call. Some data carried over the data channels are used by the wireless telephone system to supervise the handset and maintain the wireless connection between the handset and the base station, such as to alert the handset of an incoming call, send the digits of an outgoing call or control the radio channels, i.e. frequencies, on which the handset transmits and receives. The data channels are, however, also available to carry data between the handset and systems outside the wireless telephone network.

The micro-browser communicates over one of these bearer channels, preferably a data channel, with the message storage system to receive data, such as a list of messages, from the message storage system and to command the system to perform functions, such as to send the list of messages or delete a particular message, selected by the subscriber. Preferably, when sending commands or exchanging data with the message storage system, the micro-browser communicates with a "gateway", which, in turn, communicates over a a data network, such as the Internet, to the message storage system.

According to the present invention, a voice bearer channel need not be established for the subscriber to obtain a list of messages in the mailbox or to select one of these messages, e.g. for deletion or playback. Similarly, no voice port Is used on the message storage system to provide this list of messages or process other commands, e.g. delete a message.

Commands sent by the micro-browser to the message storage system have associated information that identifies the subscriber, such as the subscriber's account number on the gateway, the mobile identification number "MIN") or telephone number of the wireless handset, the subscriber's mailbox number or other information that can be mapped to the subscriber's mailbox number. This information enables the message storage system to access the correct mailbox. The message storage system maintains a data structure or queries a database that correlates the subscriber identification information with the subscriber's mailbox number. This data structure or database includes the telephone number of the subscriber's handset.

When it becomes necessary to send voice signals between the handset and the message storage system, such as to play or record a message or greeting, the handset establishes a
} voice channel, typically by placing a voice call to the message storage system, and communicates with the message storage system over the voice channel. Since the message storage system typically handles many subscribers concurrently, it is necessary for the message storage system to correlate voice calls it receives over the telephone network with commands it receives over data channels. Prior to establishing the voice channel, the handset commands the message storage system to expect a voice call from a particular wireless handset and, when this call is received, to perform a desired function, such as playing or recording voice signals carried over that voice call. The command received by the message storage system identifies the handset, from which a call is expected, e.g. by specifying the handset's MIN or telephone number or otherwise identifying the subscriber who issued the command. If necessary, the message storage system consults its data structure or database to ascertain the telephone number of the subscriber's handset and ultimately the subscriber's mailbox number. Each wireless handset has a unique telephone number, and when a call arrives at the message storage system, the telephone network provides the message storage system with the calling handset's telephone number ("calling line ID" or "CLI"). The message storage system uses this CLI to associate ("integrate") the incoming call with the command that was previously received over the data channel.

Advantageously, the subscriber is not required to enter his or her mailbox number or passcode before accessing his or her messages, as would be required if the subscriber called a conventional message storage system, because the commands sent by the micro-browser to the message storage system identify the subscriber, and only the subscriber, or a person authorized by the subscriber, has access to subscriber's handset.

In wireless telephone systems in which only one bearer channel can be active at a time, the data channel must be torn down before the voice channel is established. Once the voice channel is established, the handset can exchange subsequent commands and data with the message storage system over the voice channel, e.g. by sending or receiving touchtone, modem, frequency-shift keying (FSK) or other signals to or from the message storage system. Alternatively, the handset can cause the voice channel to be torn down after the voice signals have been sent, and the handset can reestablish a data channel and once again exchange commands and data with the message storage system over the data channel.

In wireless telephone systems in which the voice channel can operate concurrently with a data channel, such as two-way SMS or USSD, the handset can exchange commands and data with the message storage system over the data channel, and it can exchange voice signals over the voice channel, without tearing down either channel.

In other embodiments, the voice signals are encoded and sent over the data channel. In these embodiments, no voice channel is required, and commands, data and encoded voice signals are carried over the data channel.

DESCRIPTION OF THE PREFERRED EMBODIMENT

Figure 1:
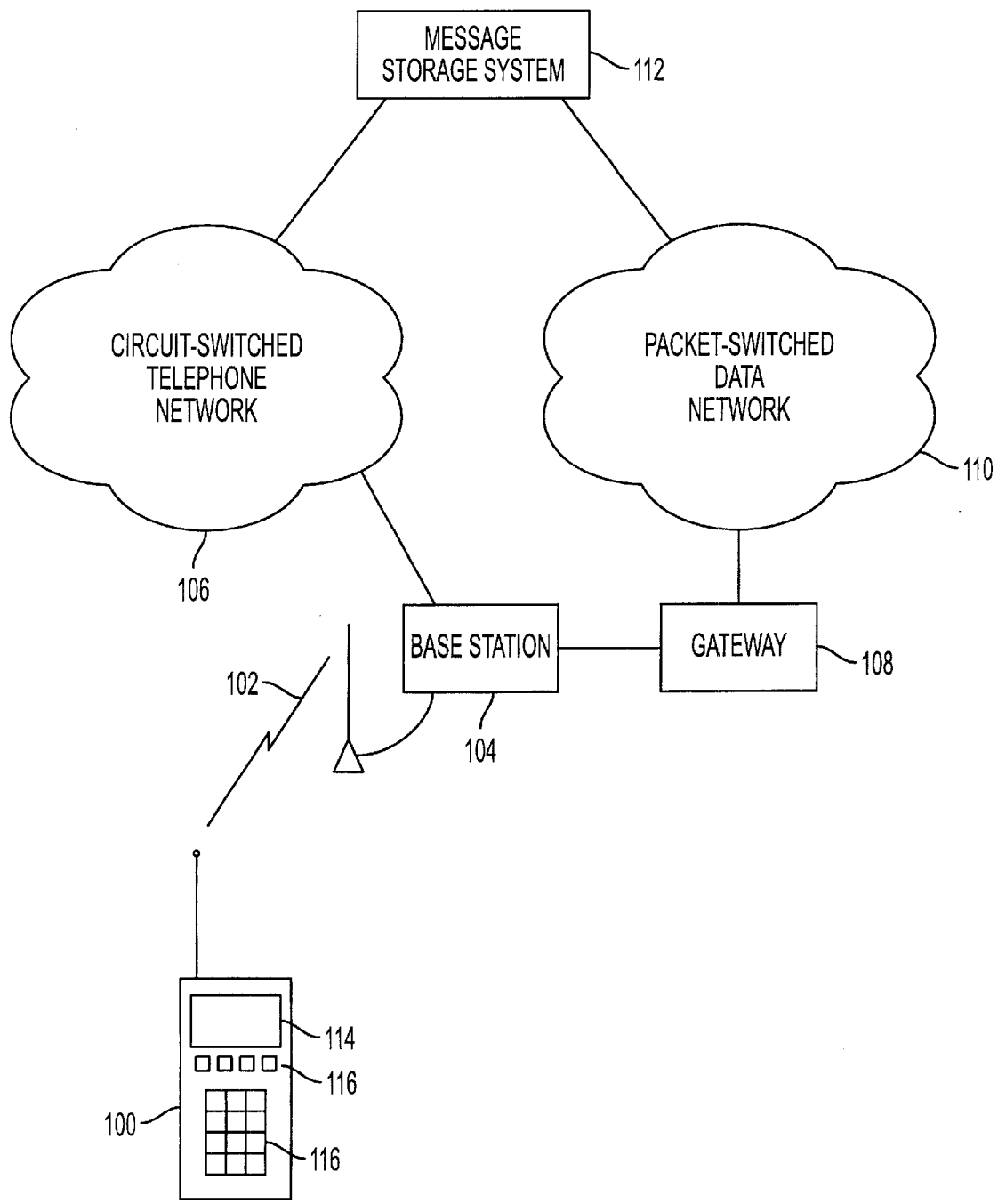
FIG. 1 is a block diagram of a wireless handset interconnected to a message storage system according to the present invention.

FIG. 1 illustrates a wireless handset 100 in radio communication over a wireless link 102 with a base station 104. The wireless link 102 carries voice and data channels (not shown). The base station 104 is connected to a circuit-switched telephone network (CSTN) 106, which can include, without limitation, one or more wireless telephone networks, long-distance telephone networks or the public switched telephone network (PSTN), and the base station routes voice calls to or from the handset 100 over the circuit-switched telephone network. The base station 104 is also connected to a gateway 108, which is connected to a packet-switched data network 110, such as, without limitation, the Internet or another public or private local area or wide area data network. The base station 104 routes data packets to or from the handset 100 through the gateway 108. The gateway 108 processes some of these data packets without recourse to other systems, and the gateway processes other of these data packets by sending or receiving data packets over the packet-switched data network 102 to or from a message storage system 112, which is connected to both the circuit-switched telephone network 106 and the packet-switched data network 110. Such a message storage system is available from Comverse Network Systems, Inc., Wakefield, Mass. under the tradename AccessNP or Trilogue INfinity enhanced services platform.

The handset 100 includes a micro-browser (not shown). A subscriber issues commands to the micro-browser by pressing keys 116 on handset 100. The micro-browser uses a protocol, such as the handheld device transmission protocol (HDTP), and a language, such as the handheld device markup language (HDML), to communicate over a data channel with the gateway 108. Such a micro-browser and gateway are available from Unwired Planet, Inc., Redwood City, Calif. A handset that includes such a micro-browser is available from Alcatel, Pads, France under the tradename One Touch PRO. The gateway 108 acts as a server responding to requests from, and supplying data to, the micro-browser. The gateway 108 formats data for display on a small screen 114 of the handset 100.

To satisfy some requests from the micro-browser, the gateway 108 communicates with the message storage system 112 using a protocol, such as the hypertext transmission protocol (HTTP), and a language, such as the hypertext markup language (HTML). The message storage system 112, thus, acts as a server to the gateway 108.

Figure 2:
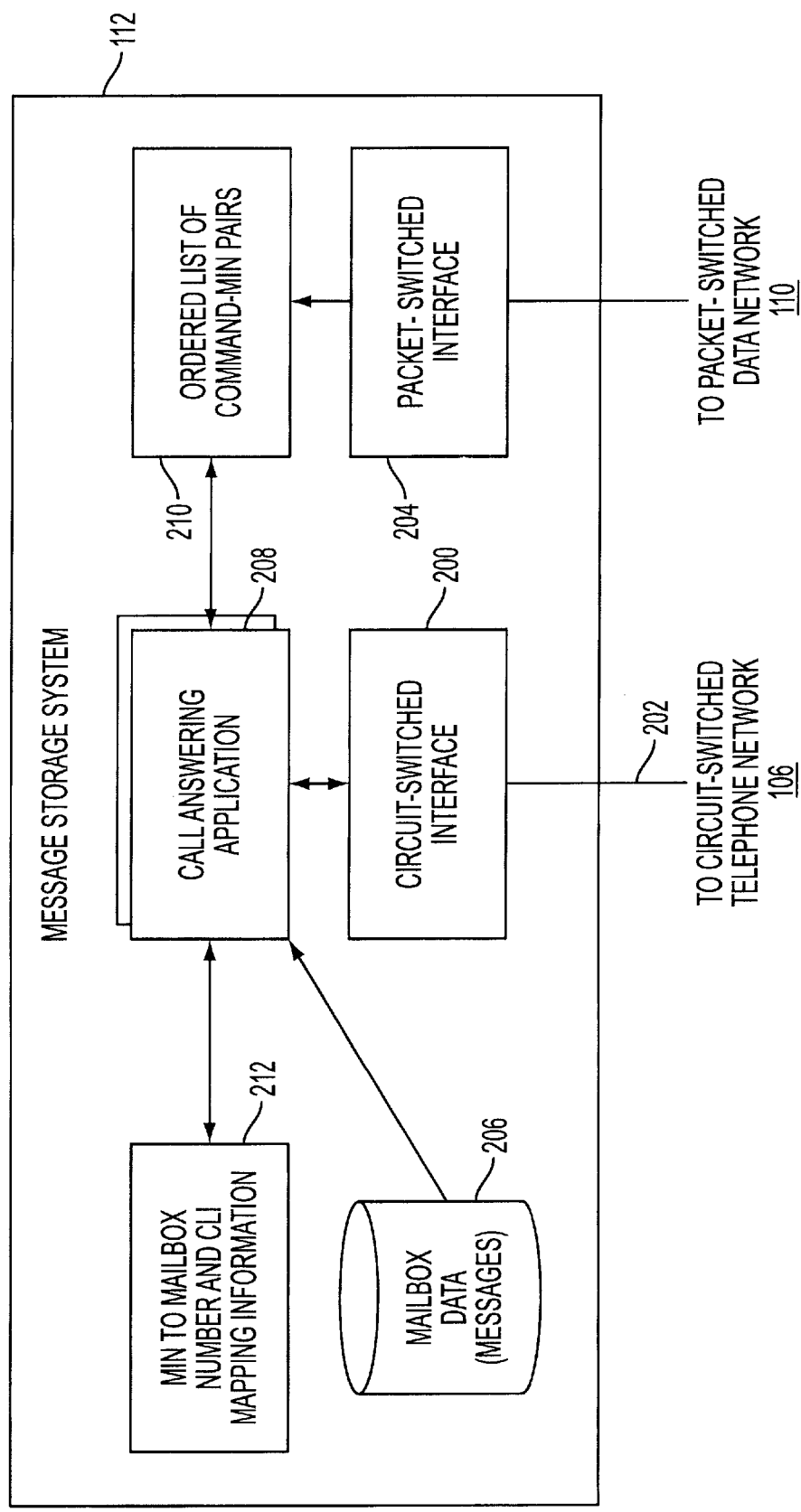
FIG. 2 is a more detailed block diagram of the message storage system of FIG. 1.

As illustrated in FIG. 2, the message storage system 112 includes a circuit-switched interface 200, by which the message storage system is connected to the circuit-switched telephone network 106, typically over a plurality of telephone trunks 202. The circuit-switched telephone network 106 preferably conforms to the Signaling System No. 7 (SS 7) protocol, however any telephone network that provides CLI is acceptable. The CLI can be provided in-and over the trunks 202 or out-of-band over the trunks or over a separate line. The message storage system 112 also includes a packet-switched interface 204, by which the message storage system is connected to the packet-switched data network 110. The message storage system 112 also stores subscribers' mailbox data 206, primarily comprising messages and greetings. One or more call answering applications 208 access the mailbox data 206 to store and retrieve these messages.

Telephone calls to subscribers are forwarded by the telephone network to the message storage system 112 when the subscribers are unable to answer these calls, e.g. because the subscribers' telephones are busy or are not answered, in which case one of the call answering applications 208 answers the call through the circuit-switched interface 200, plays the appropriate subscriber's greeting and records a message in the subscriber's mailbox 206. The subscriber can call the message storage system 112 from a conventional telephone to retrieve his or her messages, in which case one of the call answering applications 208 answers the call through the circuit-switched interface 200, prompts the subscriber to login, retrieves the subscriber's messages from the subscriber's mailbox 206 and plays the messages to the subscriber over the circuit-switched interface. Although not shown, the message storage system 112 can also receive and store other types of messages, such as facsimile messages received over the circuit-switched telephone network 106 or e-mail messages received over the packet-switched data network 110 or another data network.

Figure 3A:
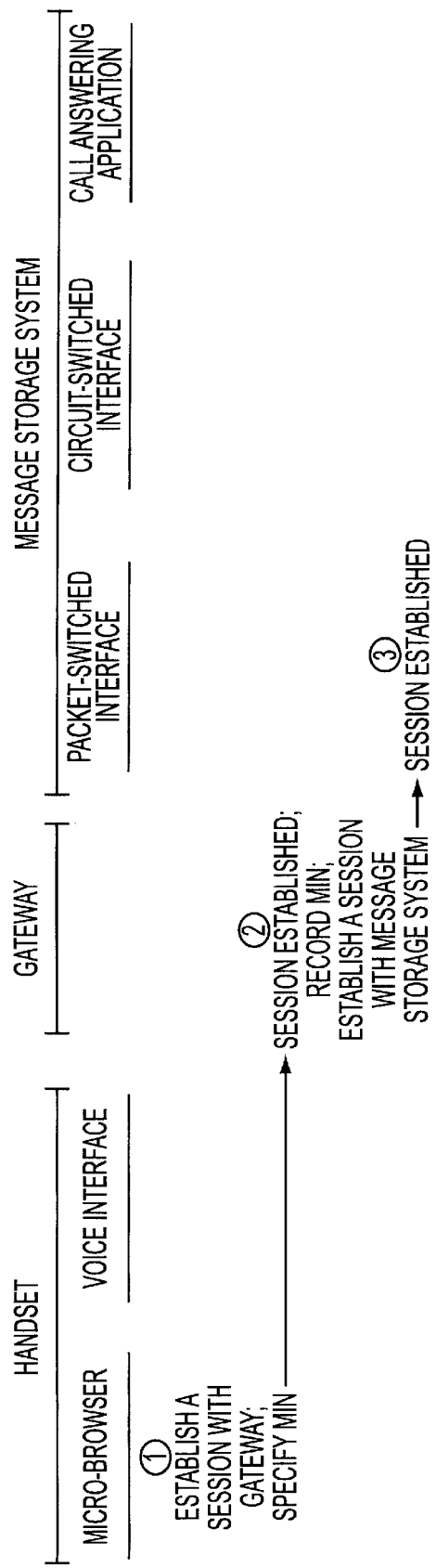
FIGS. 3a and 3b are call flow diagrams that illustrate exemplary interactions among the components shown in FIGS. 1 and 2.

As illustrated in FIG. 3a, after the handset 100 is powered on, at 1 the micro-browser establishes a data network session over a data channel 102 with the gateway 108. When establishing this session, the micro-browser specifies the handset's MIN to the gateway. At 2, the gateway 108 records the MIN and establishes a data network session over the packet-switched data network 110 with the message storage system 112. At 3, the message storage system 112 establishes this session.

Figure 3B:
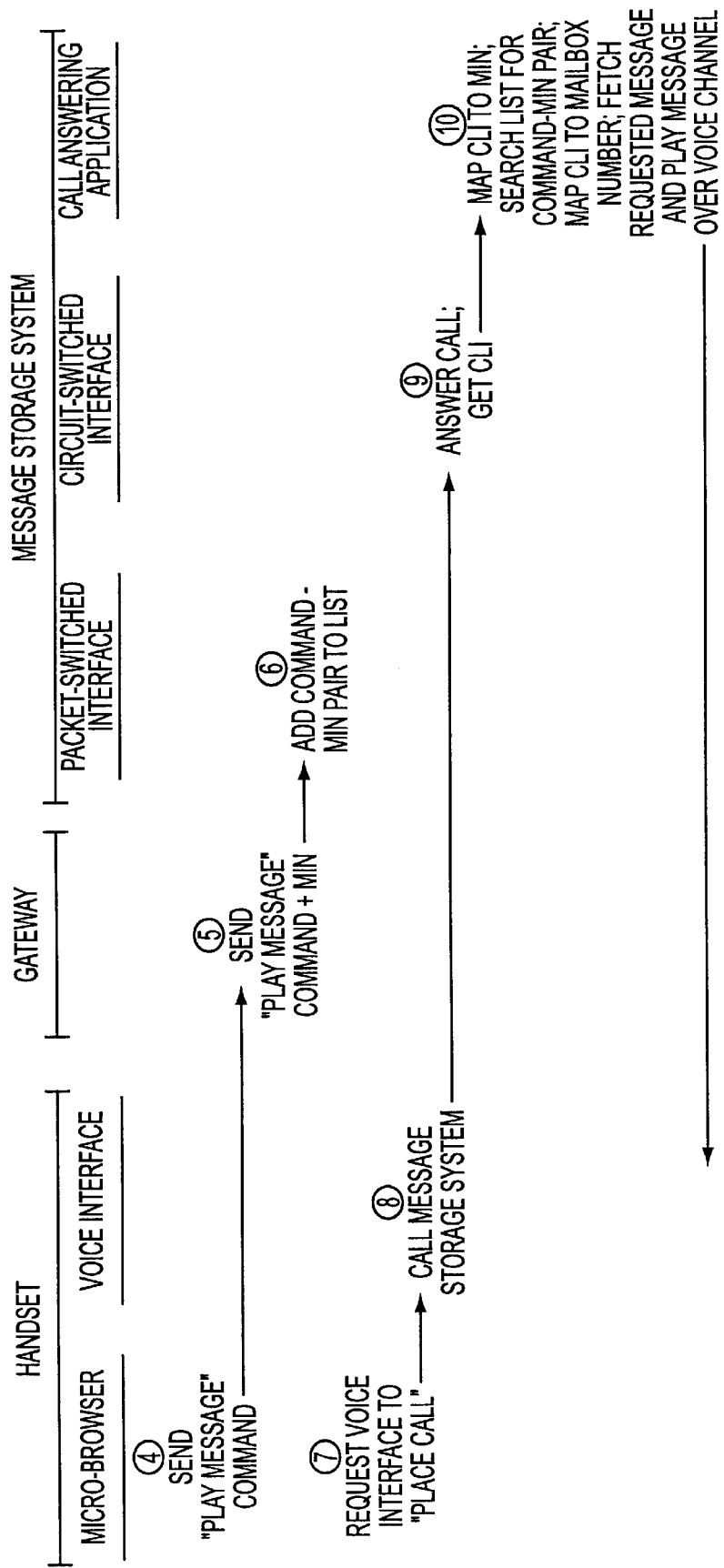

The subscriber can issue many different commands to the micro-browser. is As previously discussed, some of these commands, e.g. the command to delete a particular message from the subscriber's mailbox, cause command packets to be sent by the gateway 108 over the packet-switched data network 110 to the message storage system 112. Some of these commands, e.g. the command to obtain a list of messages in the subscriber's mailbox, cause the message storage system 112 to reply by sending one or more data packets back over the packet-switched data network 110 to the gateway 108. Some commands, such as those just mentioned, do not require a voice channel. Other commands, e.g. the command to play a particular message or record a message or greeting, do require a voice channel. FIG. 3b illustrates steps performed by various components to play a selected message. These steps exemplify steps necessary to integrate an incoming voice call at the message storage system 112 with a command that the message storage system previously received over a data channel.

At step 4, the micro-browser sends a "play message" command, which identifies a message to be played, to the gateway 108. At step 5, the gateway 108 sends a "play message" command, along with-the handset's MIN, which was previously stored in step 2, over the packet-switched data network 110 to the packet-switched interface 204. At steps 6, the packet-switched interface 204 adds this command-MIN pair to an ordered list of such pairs 210 (FIG. 2). At step 7, the micro-browser requests the voice interface of the handset 100 to place a call to the message storage system 112. At step 8, the voice interface calls the message storage system 112 over the circuit-switched telephone network 106. This call arrives at the circuit-switched interface 200 (FIG. 2) of the message storage system 112. At step 91 the circuit-switched interface 200 answers the call and receives the CLI of the handset 100.

The message storage system 112 was previously "provisioned" to identify the MIN and telephone number of the subscriber's handset 100, as well as the subscriber's mailbox number. This "mapping" information 212 is preferably stored on the message storage system 112. At step 10, the call is passed to the call answering application 208, which performs several sub-steps. The call answering application 208 consult the CLI-to-MIN mapping information 212 to ascertain the MIN of the calling handset 100, based on the CLI of the incoming call. The call answering application 208 searches the ordered list of command-MIN pairs 210 for a pair that includes the MIN of the calling handset 100. The call answering application 208 consults the MIN-to-mailbox number mapping information 212 to ascertain the subscriber's mailbox number. The call answering application 208 then performs the function commanded by the command-MIN pair, with reference to the subscribers mailbox 206. In this case, the call answering application 208 fetches the message identified by the command-MIN pair and plays the message over the voice channel, i.e. through the circuit-switched interface 200, over the circuit-switched telephone network 106, to the voice interface of the handset 100.

Command-MIN, pairs are stored in an ordered list 210, because typically the order In which commands are received over the packet-switched data network 110 is the same as the order in which voice calls are received over the circuit-switched telephone network 108, and thus search time is minimized. Periodically, command-MIN pairs that have been placed in the ordered list 210, but have not been removed for some time, preferably three to five minutes, are deleted. Voice calls arriving at the circuit-switched interface 200 that do not have corresponding command-MIN pairs in the ordered list 210 are treated conventionally, i.e. the subscriber is prompted for a mailbox number or passcode.

While in the preferred embodiment, the message storage system 112 maintains mapping information 212, the message storage system can alternatively query one or more external databases, such as an HLR or the gateway 108, for this information. In one embodiment, if the micro-browser identifies the handset 100 by sending the handset's MIN, the message storage system 112 can query an HLR with the MIN, and the HLR can return the handset's telephone number and, optionally, the subscriber's mailbox number. In another embodiment, if the micro-browser identifies the handset 100 by sending the subscriber's gateway account number, the message storage system 112 can query the gateway 108, and the gateway can return the handsets telephone number or the subscribers mailbox number. In yet another embodiment, the subscriber "self provisions" by calling the message storage system 112 and engages in an interactive voice response (IVR) session, during which the subscriber presses keys on a telephone to notify the message storage system of the subscriber's mailbox number or the handset's MIN or telephone number.

While in the preferred embodiment, the micro-browser identifies the handset 100 to the gateway 108 by the MIN of the handset, in other embodiments other mechanisms-can be used to identifying the handset or the subscriber. For example, the micro-browser can require the subscriber to enter his or her mailbox number and passcode before processing any other commands destined to the message storage system 112. In this case, the micro-browser can send the entered mailbox number and passcode to the message storage system 112 for authentication. When sending subsequent commands, the micro-browser includes the subscribers mailbox number, which obviates the need for the message storage system 112 to maintain this mapping information.

Alternatively, the micro-browser can send the telephone number of the handset 100 to the message storage system 112 along with commands, which obviates the need for the message storage system 112 to maintain CLI mapping information.

The call answering applications 208, at least portions of the circuit-switched interface 200 and the packet-switched interface 204, and mechanisms that control the ordered list of command-MIN pairs 210, the mailbox data 206 and the MIN-to-mailbox number and CLI mapping information are preferably implemented by software. Similarly, much of the gateway 108 and the micro-browser are preferably implemented by software. This software can be stored on to any of a variety of computer media, such as floppy disks, tapes, compact discs (COD-ROMs), hard disks or ZIP drives. Furthermore, this software can be stored in the memory of a computer and can control the operation of the computer.

The many features and advantages of the invention are apparent from the detailed specification and thus it is intended by the appended claims to cover all such features and advantages of the invention that fall within the true spirit and scope thereof. Furthermore, since numerous modifications and changes will readily occur to those skilled in the art, it is not desired to limit the invention to the exact construction operation illustrated and described, and accordingly all suitable modifications and equivalents maybe resorted to, falling within the scope of the invention.

What is claimed is:

1. A system, comprising:
  a message system storing a voice message; and
  a portable wireless telephone capable of communicating with the message system, having an audio output, preparing the message system for playing the message prior to establishing communication with the message system for the playing responsive to a data command and playing the voice message through the audio output.

2. A system as recited in claim 1,
  wherein the telephone further comprises a display screen, and
  wherein said message system produces a list of the voice messages, the list of the voice messages is displayed on the display screen and the voice messages played are selected from the list on the display.

3. A system as recited in claim 1, further comprising:
  a voice channel coupled between said message system and said telephone and carrying the voice message; and
  a data channel coupled between said message system and said telephone and carrying the command.

4. A system as recited in claim 3 wherein said telephone controls message functions through the data channel.

5. The system of claim 1,
  wherein the message system stores non-voice messages, and
  wherein the telephone further comprises a display screen, the telephone displaying the non-voice messages on the display screen responsive to the data command, which prepares the message system for the displaying.

6. The system of claim 5,
  wherein the message system produces a list of the non-voice messages, the list of the non-voice messages is displayed on the display screen and the non-voice messages displayed are selected from the list on the display.

7. A system, comprising:
  a message storage system storing a voice message;
  a voice bearer channel coupled to said system;
  a data bearer channel coupled to said system; and
  a portable wireless telephone coupled to the data and voice bearer channels, communicating with the message system over the channels, having an audio output, preparing the message storage system for playing the message prior to establishing communication with the message storage system for the playing responsive to a data command over the data bearer channel and playing the voice message through the audio output.

8. The system as recited in claim 7, wherein messages received over said voice bearer channel are correlated by said message storage system with commands received over said data bearer channel.

9. A message system, comprising:
  a message storage system storing a voice message and a non-voice message;
  a circuit-switched telephone network coupled to said storage system;
  a packet-switched data network coupled to said storage system;
  a gateway coupled to said data network;
  a base station coupled to said gateway and said telephone network;
  a portable wireless telephone communicating with said base station;
  a voice bearer channel provided between said telephone and said storage system through said telephone network;
  a data bearer channel provided between said telephone and said storage system through said data network; and
  said telephone communicating with the storage system over the channels, having an audio output and a display, displaying the non-voice message on the display responsive to associated display commands over the data bearer channel, preparing the message storage system for playing the voice message prior to establishing communication over the voice bearer channel with the message storage system for the playing responsive to associated data, commands over the data bearer channel and playing the voice message through the audio output.

10. A process, comprising:
  storing in a message system a voice message for a subscriber; and
  preparing the message system to perform voice message functions prior to establishing communication with the message system to perform the voice message functions responsive to data commands by the subscriber from a portable wireless telephone and providing the voice message to the portable wireless telephone.

11. A process as recited in claim 10, further comprising establishing voice and data channels to the message system and correlating a message mail box with the voice channel and the data channels.

12. A process as recited in claim 10, receiving a voice message play command over the data channel and playing a voice message over the voice channel.

13. A storage media including a process controlling a computer by storing a voice message for a subscriber and preparing the computer to perform voice message functions prior to establishing communication with the computer to perform the voice message functions responsive to data commands by the subscriber from a portable wireless telephone and providing the voice message to a portable wireless telephone.

14. A process, by which a subscriber, using a portable wireless telephone, retrieves a message stored in a message storage system, comprising:

establishing a data channel between the portable wireless telephone and the message storage system;

sending information over the data channel to the message storage system, the information identifying the subscriber and the message, thereby preparing the message storage system to subsequently communicate with the portable wireless telephone over a voice channel and play the message over the voice channel;

establishing the voice channel between the portable wireless telephone and the message storage system; and playing the message over the voice channel.

15. A process, by which a subscriber, using a portable wireless telephone, stores a message on a message storage system, comprising:

establishing a data channel between the portable wireless telephone and the message storage system;

sending information over the data channel to the message storage system, the information identifying the subscriber and commanding the message storage system to store the message, thereby preparing the message storage system to subsequently communicate with the portable wireless telephone over a voice channel and receive the message over the voice channel;

establishing the voice channel between the portable wireless telephone and the message storage system; and sending the message over the voice channel to the message storage system.

16. A process, by which a subscriber, using a portable wireless telephone, controls processing of a message on a message storage system, comprising:

establishing a data channel between the portable wireless telephone and the message storage system;

sending information over the data channel to the message storage system, the information, the information identifying the subscriber and commanding the message storage system to process the message, thereby preparing the message storage system to subsequently communicate with the portable wireless telephone over a voice channel to complete processing of the message;

establishing the voice channel between the portable wireless telephone and the message storage system; and completing processing the message over the voice channel.

17. A system, comprising:

a message storage system storing a message;

a portable wireless telephone playing/recording the message; and a data channel between the portable wireless telephone and the message storage system, the portable wireless telephone sending information identifying the subscriber and the message over the data channel to the message storage system to prepare the message storage system to subsequently communicate with the portable wireless over a voice channel and to play/record the message over the voice channel to/from the portable wireless telephone.

18. A system, comprising:

a message system storing a voice message; and a portable wireless telephone capable of initiating a data command, capable of communicating with the message system and having an audio output; and wherein the message system is configured to respond to the data command by preparing to play the voice message through the audio output once communication with the message system is established.

* * * * *